July 26, 1966  O. E. PHELPS  3,262,532
SPRING DEVICE FOR ASSISTING CLUTCH OPERATORS
Filed March 10, 1965  2 Sheets-Sheet 1

INVENTOR.
ORVILLE E. PHELPS
BY Walter E. Pavlick
Harold D. Shall
Peter Vrahotes

July 26, 1966    O. E. PHELPS    3,262,532
SPRING DEVICE FOR ASSISTING CLUTCH OPERATORS
Filed March 10, 1965    2 Sheets-Sheet 2

INVENTOR.
ORVILLE E. PHELPS

United States Patent Office 3,262,532
Patented July 26, 1966

3,262,532
SPRING DEVICE FOR ASSISTING
CLUTCH OPERATORS
Orville E. Phelps, Fort Wayne, Ind., assignor to Dana Corporation, Toledo, Ohio, a corporation of Virginia
Filed Mar. 10, 1965, Ser. No. 438,635
7 Claims. (Cl. 192—89)

The present invention relates in general to mechanical assist devices for clutches and is more particularly directed to a mechanical assist device including means for cooperation with the controls of the clutch and responsive upon movement of the controls to transmit rotary motion to assist an operator in the operation of the clutch. This application is a continuation-in-part of my copending application, Serial No. 297,640, filed July 25, 1963, and now abandoned.

Assist devices in themselves are old and well known and are being utilized extensively throughout the industry. Prior devices in this particular class have taken the form of fluid or spring loaded devices which were adapted for storing energy and operative to exert axial thrust forces for assisting an operator in the operation of the clutch. These devices incorporate fluid or spring means held in a normally pre-loaded position and means operative upon limited rotation of the clutch operating mechanism to release the same for movement in an axial direction. Although serving the purpose for which they were intended such devices were deficient in that a considerable amount of operating space was required to accommodate the unloading operation making it necessary to utilize an assist housing member of extreme length. The utilization of such structures have proven unsatisfactory for a number of reasons. One of the most undesirable features arising from this was that the number of locations of the assist device relative to the clutch operating mechanism was very limited due to its size while still another was concerned with the cumbersomeness of the assist device itself.

It is common practice in the art to locate the assist device within close proximity to the operating mechanism of the clutch in order to minimize the use of an excessive amount of connecting linkage therebetween. Previously, this was done by positioning the assist device intermediate the clutch structure and the pedal or lever and positively connecting one end of the assist device to the clutch pedal or lever and securing the opposite end to a stationary member thereby permitting the assist device to react directly against the pedal in assisting in the operation of the clutch. In another instance the assist device was located in much the same manner except that the operating means of the clutch was altered and the assist device was connected thereto so as to permit the same to react directly on the operating means. Both required structural variations in the conventional clutch operating arrangements to accommodate the assist device. Furthermore, the assist devices could only be located externally of the clutch structure because of their size and as a result were subject to damage by foreign objects.

Therefore, it is an object of this invention to provide a compact assist device which can be positioned within the bell housing of a clutch structure thereby eliminating the need of additional control linkage and further making the same less susceptible to damage.

Another object of this invention is to provide an assist device which is responsive to rotative movement of the clutch operating mechanism to aid in further rotative movement of the clutch operating mechanism for assisting in the operation of the clutch.

It is another object of this invention to provide a device of the type described wherein energy storing means is used to assist rotary movement of the clutch operating mechanism in response to limited rotative movement thereof.

Still another object of this invention is to utilize the energy of the clutch engaging springs by storing the same and releasing the same upon limited rotative movement of the clutch operating mechanism to aid the operator in operating the clutch.

A still further object of this invention is to provide locking means associated with the energy storing means which locking means is operative to release the stored energy therein upon limited rotative movement of the clutch operating mechanism.

It is still another object of this invention to provide an assist device which is simple in construction, inexpensive to assemble and manufacture, highly efficient in operation and of durable construction.

In one preferred embodiment of this invention a stationary member is constructed and arranged to house a normally engaged clutch and the operating mechanism therefor. Manually operable means is connected to the clutch operating mechanism and is selectively operable at the will of an operator to cause rotative movement of the clutch operating mechanism for controlling the operation of the clutch. An assist device is connected to the manually operable means and operative upon limited rotary movement thereof to impart additional rotative movement to the clutch operating mechanism thereby assisting the operator in operating the clutch.

Further objects and advantages will become apparent to one skilled in the art upon consideration of the following detailed description when taken in connection with the accompanying drawings wherein.

Figure 1:
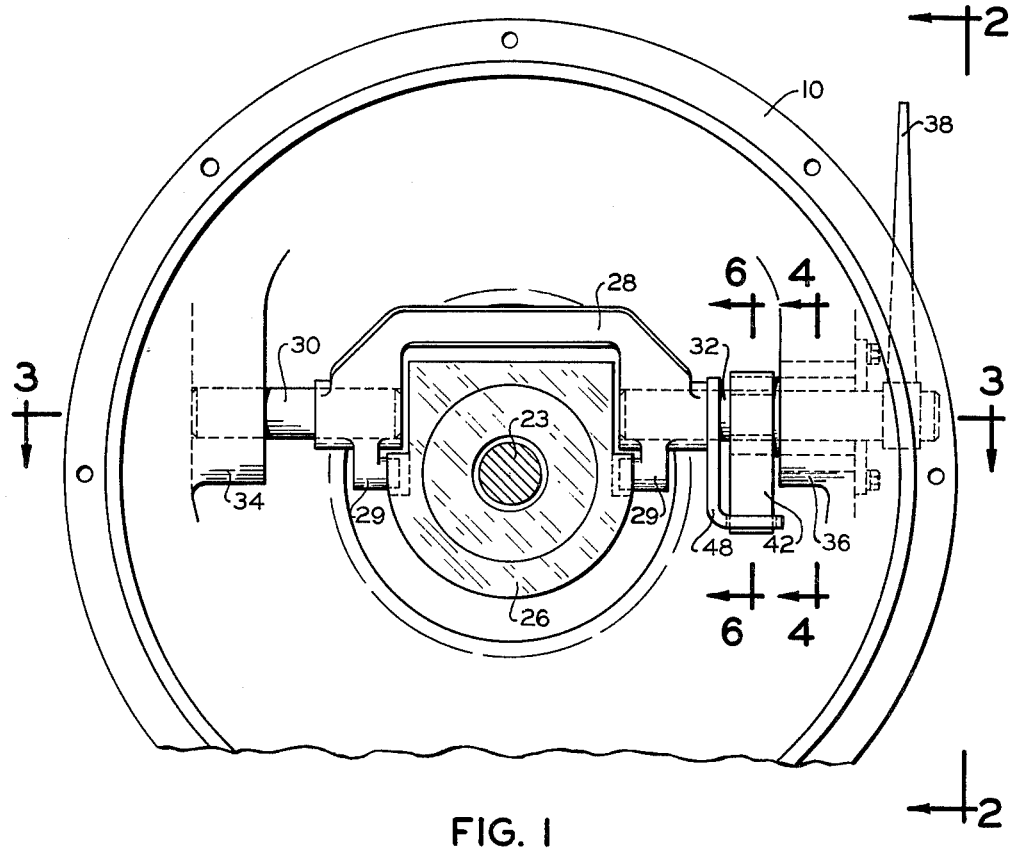
FIG. 1 is an end elevational view of a clutch structure embodying the present invention with parts removed for clarity.
Figure 3:
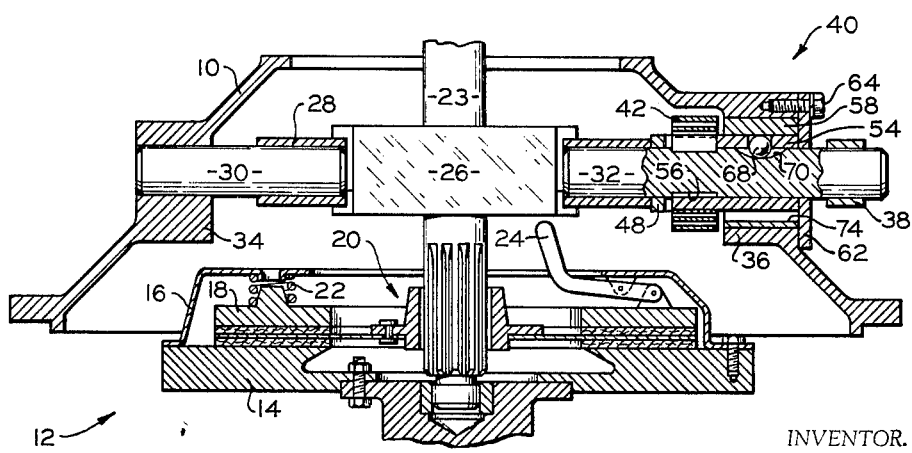
FIG. 3 is a longitudinal sectional view of the clutch structure of FIG. 1 taken substantially along lines 3—3 of FIG. 1.
Figure 2:
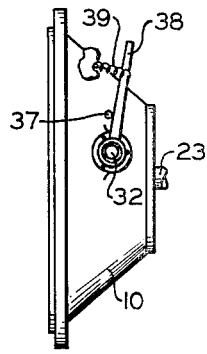
FIG. 2 is a reduced side elevational view of the clutch structure of FIG. 1.

Referring now to the drawings and more particularly to FIG. 3 the present invention is shown being incorporating within a stationary member or bell housing 10 and cooperating with a well known type of spring loaded clutch indicated generally by the reference numeral 12. The bell housing, as it will be referred to hereinafter, is of conventional design and adapted to be securely held between a standard engine and transmission housing (not shown). While a normally engaged clutch has been shown other types can be satisfactorily adapted for use with the present invention. Since the clutch is of a well known type which includes an operative and an inoperative position, it will be sufficient to discuss the operating parts thereof in a general manner. The clutch 12 is shown cooperating with an engine driven flywheel 14, and comprises a cover member 16 secured to and rotatable with the flywheel and a pressure plate member 18 biased into frictional engagement with a driven member 20 by means of a plurality of resilient means or engaging springs 22 (only one shown). The engaging springs 22 are disposed within the cover member 16 for cooperation with the pressure plate member 18 to normally bias the clutch into its operative position.

For moving the clutch 12 to its inoperative position, operating means is provided to carry the pressure plate member 18 away from engagement with the driven member 20 which is splined to the transmission input shaft 23. To this end a plurality of release levers 24 (only one shown) are pivotally secured to the cover member 16 at a point intermediate their end portions and have the outer ends thereof pivotally fixed to the pressure plate member 18 while the inner ends are adapted to cooperate with an annular release bearing 26 which is mounted for reciprocal movement on the transmission input shaft 23. Inward movement of the release bearing 26 will cause the levers to pivot in a counterclockwise direction carrying the pressure plate member 18 away from engagement with the driven member 20 against the biasing effect of the engaging springs 22 thereby disengaging the clutch. From this will be evident that reciprocal movement of the release bearing 26 controls the operation of the clutch.

A manually operable means is operatively connected to the release bearing 26 and is selectively operable at the will of an operator to cause movement of the release bearing. More particularly, a yoke member 28 is shown adjacent the release bearing and has engaging arms 29 thereon for cooperation with suitable engaging portions provided on the release bearing. Shaft means is secured to the yoke member 28 for unitary rotation therewith and is rotatably mounted with respect to the housing 10. The shaft means consists of a pair of spaced apart cross shafts 30, 32 journaled in suitable bosses 34, 36 provided in the housing 10. A conventional lever 38 is secured to a portion of the cross shaft 32 which extends outside the housing 10 for operation by the operator. The clutch engaging springs 22 serve to hold the clutch in its normally engaged position while the lever 38 is held in a substantially upright position against a stop pin 37 by a spring 39 which normally urges the lever in a counterclockwise direction as viewed from the right of FIG. 3.

Because of the high torque output of present day engines the clutches utilized must be capable of transmitting high torque loads. As a result of this the engaging springs employed in such clutches must be of a high compressive strength in order to provide a substantial engaging pressure between the pressure plate member and the driven member so as to prevent slippage therebetween. From this it will be apparent that the greater the compressive strength of the engaging springs the more effective the clutch will be. Also, it will be obvious that under these conditions the greater the compressive strength of the engaging springs the greater will be the physical effort required by the operator on the lever in order to overcome the biasing effect of the engaging springs to cause disengagement of the clutch.

To reduce this physical effort on the part of the operator the present invention provides an assist device, shown generally at 40 which is adapted to assist the operator in operating the clutch.

More particularly, a coiled clock spring 42 is disposed about the cross shaft 32 and has a hook portion 44 on the outer end thereof which is secured in an opening 46 provided in an end of a bracket 48. The body portion of the bracket 48 is disposed inwardly from the clock spring 42 and about the cross shaft 32 and is secured thereto for unitary rotation therewith.

The inner end of the clock spring 42 is also provided with a hook portion 50 (see FIG. 6) which is secured within an opening 52 in a sleeve member 54. The sleeve member 54 is rotatably disposed about the cross shaft 32 and has one of its end portions positioned within the clock spring 42. The cross shaft 32 is provided with a reduced diameter portion 56 adjacent the hook portion 50 of the clock spring so as not to interfere with the connection thereof to the sleeve member 54.

The outer end of the sleeve member 54 is rotatably disposed within a sleeve-like bushing member 58. The bushing member 58 is secured by a press fit into an opening provided in the boss 36 and is also provided with a lock screw 60 engaged therewith and threaddedly received in the housing 10 to prevent any relative movement between the housing and the bushing 58. A cover plate 62 is suitably secured by bolts 64 to the outside of the boss 36 to prevent the ingress of any foreign matter and also to serve as a convenient access for repairs.

Locking means is provided to control the biasing effect of the clock spring 42 on the rotation of the cross shaft 32. To this end, the sleeve member 54 is provided with a plurality (3 in this instance) of radially extending guide openings 66. A locking member such as a spherical ball 68 is provided in each of the guide openings 66 and the diameter of the ball is such that the ball protrudes from the guide opening. Detent means are provided in the periphery of the cross shaft 32 and in the internal surface of the bushing 58 to accommodate a portion of the ball 68 to alternately lock the sleeve member 54 to the cross shaft 32 and the bushing 58. The detent means in the cross shaft 32 takes the form of a plurality of circumferentially spaced and arcuately shaped recesses 70 having inwardly slanted side walls defining a cam surface 72. The detent means in the bushing 58 take the form of a plurality of circumferentially spaced and elongated grooves 74 having outwardly slanted side walls defining a cam surface 75 extending the full axial length of the bushing. The depth of the grooves 74 and the recesses 70 are such that the balls 68 are accommodated either in the guide openings 66 and recesses 70 or alternatively in the guide openings 66 and the grooves 74.

Figure 4:
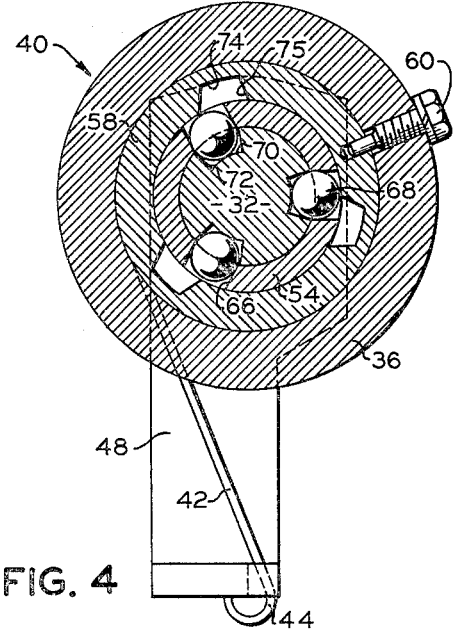
FIG. 4 is an enlarged cross-sectional view of the assist device of the present invention taken substantially along lines 4—4 of FIG. 1 and showing the assist device in one of its operative positions.
Figure 5:
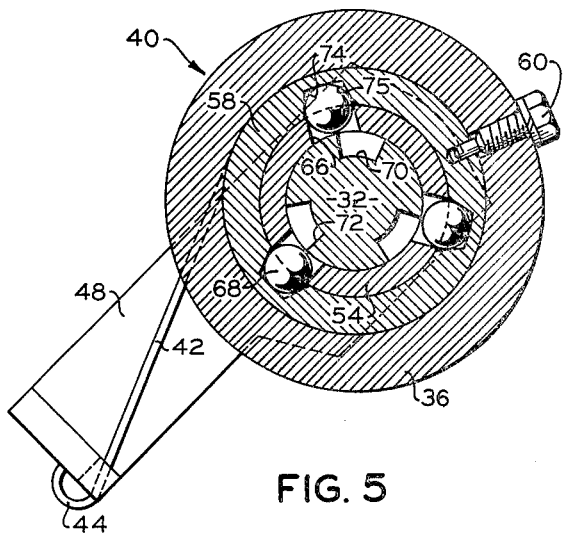
FIG. 5 is a view similar to FIG. 4 showing the assist device in another of its operative positions.
Figure 6:
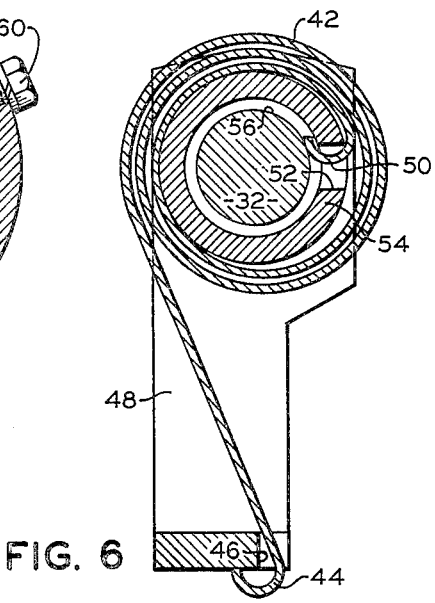
FIG. 6 is a cross-sectional view taken along lines 6—6 of FIG. 1 showing the connection of the energy storing means.

As shown in FIG. 3 the clutch 12 is in its normally engaged position, with drive being transmitted therethrough, while the assist device 40 is held in its inoperative or energy storing position as viewed in FIG. 4. The engaging springs 22 are biasing the pressure plate member 18 into driving engagement with the driven member 20 and as a result, through the reaction load thereof acting on the levers 24 and release bearing 26, have biased the cross shaft 32 to a position to maintain the balls 68 in cooperative engagement with the recesses 70 in the cross shaft 32 and the guide openings 66 in the sleeve 54 locking the two together for unitary rotation; the radially outer portion of the balls 68 being in engagement with the internal surface of the bushing 58 and retained thereby in the recesses 70. Since one end of the clock spring 42 is being held to the cross shaft 32 by the bracket 48 and the other end of the spring is being held to the cross shaft by the sleeve 54; the sleeve at this time being secured to the cross shaft by the balls 68, the biasing effect thereof is held inoperative and is contained within the cross shaft. In disengaging the clutch 12 the operator rotates the lever 38 in a clockwise direction (looking from the right of FIG. 3) which causes simultaneous clockwise rotation of the cross shafts 30, 32, yoke member 28 and bracket 48 and inward movement of the release bearing 26. As the operator is moving the lever in the clutch disengaging direction the following operations will occur with respect to the assist device 40. The cross shaft 32, the balls 68 and sleeve 54, being locked together, will rotate about the axis of the shaft 32 relative to the stationary bushing 58. As the guide openings 66 in the sleeve 54 become aligned with grooves 74 in the bushing the balls 68 will be forced radially outwardly by the cam surfaces 72 and into cooperative engagement with the grooves 74 in the bushing 58 thus freeing the cross shaft 32 to rotate relative to the sleeve and bushing as the operator continues the disengaging operation. This camming movement results from the fact that the cross shaft 32 is moving clockwise while the spring 42 is urging the sleeve 54 counterclockwise; the reaction load of the spring urging the balls 68 against the cam surface 72. Prior to reaching the aligned position, the inner surface of the bushing 58 retains the balls 68 in the recesses 70; however, when the grooves 74 become aligned with the balls, the latter move radially outwardly into the grooves. Upon completion of this described phase of operation, the assist device 40 has moved to its operative position as shown in FIG. 5 wherein the clock spring 42 has its inner end locked to the stationary housing 10 through sleeve 54, balls 68 and bushing 58 while the outer end is still positively connected to the cross shaft 32 through the bracket 48. The balls 68, at this time, are retained in the grooves 74 by the engagement between the radially inner surface of the balls and the periphery of the shaft 32 disposed between the recesses 70. Under these conditions the clock spring 42 is free to unwind in a clockwise direction, as seen in FIGS. 4–6, thus transmitting its stored energy to the bracket 48 to rotate the cross shaft 32 thereby assisting the operator in disengaging the clutch. Throughout the above operation clockwise rotation of the lever 38 will simultaneously be moving the release bearing 26 inwardly tending to cause the release levers 24 to be pivoted and thereby compressing engaging springs 22 and carrying the pressure plate member 18 out of engagement with the driven member 20. To re-engage the clutch the operator releases the lever 38 allowing the return spring 39 to move the same in a counterclockwise direction to its original position while clutch engaging springs 22 force the pressure plate member 18 back into engagement with the driven member 20 thus biasing the levers 24 to move the release bearing 26 back to its starting position. Movement of the release bearing in this direction will cause counterclockwise rotation to be transmitted to the cross shafts 30, 32 and as a result the clock spring 42 will be rewound and forced back into its energy storing position. The balls 68 will now lock the sleeve 54 to the cross shaft 32 as shown in FIG. 4. This locking movement of the balls 68 from their position in the grooves 74, as shown in FIG. 5, to their position in the recesses 70, as shown in FIG. 4, results from the fact that as the cross shaft 32 moves counterclockwise to the bracket 48 it rewinds the spring 42 and the spring reacts on the sleeve 54 tending to urge the latter counterclockwise relative to the stationary bushing 36 which induces a camming action between the balls and the sides of the grooves 74 urging the balls radially inwardly. The balls 68 are retained in the grooves 74 by the portion of the periphery of the cross shaft 32 lying between the recesses 70 which is engaging the balls, until the shaft 32 moves counterclockwise to move the recesses 70 into alignment with the balls 68 and the latter are cammed thereinto. Further counterclockwise movement of the cross shaft 32 to its position of FIG. 4 moves the portions of the inner surface of the bushing 36 intermediate the grooves 74 into engagement with the radial outer portion of the balls 68 and retains the latter in the recesses 70 as previously described. Thus, it is apparent that upon disengagement of the clutch by the combined effort of the operator and the assist mechanism 40, the energy released by the clock spring 42 to assist in the disengaging operation and the effort of the operator have traveled through the control mechanism and are stored in the clutch engaging springs 22 until such time as the operator releases the lever to re-engage the clutch at which time the engaging springs, which are no longer restrained by the operator's effort, bias the control mechanism to restore the energy to the clock spring for the next operation.

While only a preferred embodiment of this invention has been shown and described, it will be understood that modifications and variations can be made without departing from the scope of the invention as defined by the following claims.

What is claimed is:

1. In cooperation with a clutch having a clutch cover and resilient means disposed within the clutch cover for normally biasing the clutch to an operative position the combination comprising
  (a) a bell housing disposed about said clutch,
  (b) a pair of aligned cross shafts journaled in said bell housing for rotation with respect thereto,
  (c) manually operative means operatively connected to one of said cross shafts and selectively operative to cause rotation thereof,
  (d) a yoke member connecting said cross shafts for unitary rotation,
  (e) release means disposed adjacent said yoke member and operatively connected thereto whereby rotation of said cross shafts causes reciprocal movement of said release means,
  (f) lever means pivotally mounted with respect to said clutch cover and operatively connected to said clutch and having the inner ends thereof operatively connected to said release means whereby movement of said release means in one direction causes said clutch to become inoperative against the bias of said resilient means,
  (g) assist means including energy storing means disposed about one of said cross shafts and being operative to store energy of said resilient means upon release of said manually operable means and movement of said release means in the other direction,
  (h) locking means including
    (1) a sleeve disposed about one of said cross shafts,
    (2) detent means carried by said bell housing and said one cross shaft,
    (3) guide openings in said sleeve member, and
    (4) locking members normally disposed in said guide openings and said detent means in said one cross shaft for securing said sleeve to said one cross shaft, and said locking members being disposed in said guide openings and the detent means carried by said bell housing upon limited rotary movement of said one cross shaft whereby said sleeve is connected to said bell housing and said energy storing means becomes operative to aid rotation of said one cross shaft and assist the operator in operating the clutch.

2. The combination of claim 1 wherein said energy storing means is a coil spring.

3. The combination of claim 2 wherein said coil spring is operatively connected to said sleeve at one end and to one of said cross shafts at its opposite end.

4. A normally engaged resiliently loaded clutch and an operating mechanism therefor wherein said clutch includes driven means and a pressure plate means adapted to engage said driven means when in an engaged position for coaxial torque transferring rotation and to be axially spaced from said driven means when in a disengaged position comprising in combination,
  (a) a stationary housing means substantially enclosing said driven means and pressure plate means,
  (b) first resilient means disposed in said housing means for urging said pressure plate means axially into engagement with the driven means,
  (c) release means disposed in said housing means and having first and second axially opposed positions and including linkage means operatively connecting the same to said pressure plate means,
  (d) said first and second positions of said release means corresponding respectively to said engaged and disengaged positions of said pressure plate means,
  (e) said first resilient means being operative to urge the pressure plate means to its engaged position and through said linkage means simultaneously urge said release means to its first position,
  (f) means for moving said release means from its first to its second position accompanied by simultaneous axial movement of said pressure plate means from its engaged to its disengaged position against the urging of said first resilient means and including,
    (1) a manually operated means movable relative to said housing means to first and second opposed positions corresponding respectively to said first and second positions of said release means and having at least a first portion thereof in the form of a first member disposed within and carried by said housing means and at least a second portion thereof disposed externally of said housing means, (2) an assisting second resilient means disposed in said housing means for urging said manually operated means from its first to its second position, and (3) means connecting said manually operated means to said release means for substantially simultaneous movement whereby said first resilient means in biasing said release means to its first position biases said manually operated means to its first position and movement of said manually operated means to its second position from its first position induces corresponding movement of said release means to its second position, (g) said housing means including a stationary portion in the form of a second member disposed in cooperative relationship with said second resilient means, (h) said second resilient means having a first and a second operative end, (i) locking means for securing both ends of said second resilient means to one of said members and retaining said second resilient means in an energy stored condition and being operative to secure one of said ends to the other of said members while maintaining the other of said ends secured to said one member upon movement of said manually operated means from its first toward its second position whereby said second resilient means reacts between said members and biases said manually operated means toward its second position, (j) said second resilient means inducing a lesser biasing load on said manually operated means than said first resilient means so that to move said manually operated means from its first to its second position an additional manual load must be imposed thereon.

5. A device according to claim 4 wherein said manually operated means is rotatably mounted in said housing means and rotates in opposed directions between its first and its second positions and with said pressure plate means in its disengaged position and upon release of the manual load from said manually operated means, said first resilient means biases said pressure plate means into engagement with the driven means and thereby simultaneously biases said release means and said manually operated means from their second to their first position against the biasing of said second resilient means, and upon said manually operated means substantially reaching its first position, said locking means disengages said one end of said second resilient means from said other member and secures the same to said one member thereby placing said second resilient means in an energy storing condition and inoperative to bias said manually operated means toward its second position.

6. A normally engaged resiliently loaded clutch and an operating mechanism therefor wherein said clutch includes driven means and a pressure plate means adapted to engage said driven means when in an engaged position for coaxial torque transferring rotation and to be axially spaced from said driven means when in a disengaged position comprising in combination, (a) stationary housing means substantially enclosing said driven means and pressure plate means, (b) first resilient means disposed in said housing means and mounted for unitary rotation with said pressure plate means and constantly imposing a biasing force on said pressure plate means for urging the same axially into engagement with the driven means, (c) release means disposed in said housing means and having first and second axially opposed positions and including linkage means operatively connecting the same to said pressure plate means, (d) said first and second positions of said release means corresponding respectively to said engaged and disengaged positions of said pressure plate means, (e) said first resilient means being operative to urge said pressure plate means to its engaged position and through said linkage means simultaneously urge said release means to its first position, (f) means for moving said release means from its first to its second position accompanied by simultaneous axial movement of said pressure plate means from its engaged to its disengaged position against the urging of said first resilient means and including, (1) a cross shaft means rotatably mounted in said housing means and rotatable in opposed directions to first and second opposed positions corresponding respectively to said first and second positions of said release means and having at least a portion thereof in the form of a first member disposed within said housing means, (2) means secured to said cross-shaft means and having at least a portion thereof disposed exterior of said housing means and adapted to be manually operated for rotating said cross-shaft means to its first and second positions, (3) an assisting second resilient means disposed in said housing means and adapted to react against said housing means and act upon said cross-shaft means for urging said cross-shaft means from its first to its second position, and (4) means connecting said cross-shaft means to said release means for substantially simultaneous movement whereby said first resilient means in biasing said release means to its first position biases said cross-shaft means to its first position, and movement of said cross-shaft means to its second position from its first position induces corresponding movement of said release means to its second position, (g) said housing means including a stationary portion in the form of a second member disposed in cooperative relationship with said second resilient means, (h) said second resilient means having a first and a second operative end, (i) an intermediate means operatively disposed between said members and adapted to be alternately secured to said first member for unitary rotation therewith and to said second member in a stationary relationship therewith, (j) means securing one end of said resilient means to said intermediate means, (k) means securing the other end of said resilient means to one of said members, (l) and securing means for securing said intermediate means to said one member for retaining said resilient means in an energy stored condition when said cross-shaft is disposed substantially in its first position and being operative upon movement of said cross-shaft means from its first toward its second position to release said intermediate means from said one member and secure it to the other of said members whereby said resilient means reacts between said members and biases said cross shaft means toward its second position, (m) said second resilient means (1) being maintained by at least one of said members from rotating about the axis of said cross shaft means, and (2) inducing a lesser biasing load on said cross shaft means than is induced thereon by said first resilient means so that to move said cross shaft means from its first to its second position an additional manual load must be imposed thereon, (n) said securing means being operative to secure said intermediate means to said one member upon the return of said cross shaft means to its first position from its second position.

7. A device according to claim 6 wherein,
(a) said cross shaft means is disposed in a direction transverse with respect to the axis of rotation of said pressure plate,
(b) said intermediate means is a sleeve rotatably disposed on said cross shaft means and in said housing means,
(c) said securing means comprises a plurality of radially movable locking means constantly engaging said sleeve,
(d) said cross shaft means and said housing means each have detent means therein adapted to be alternately engaged by said locking means whereby said sleeve means may be alternately
   (1) secured to said housing means and maintained stationary relative to said cross shaft means, and
   (2) secured to said cross shaft means and rotate unitarily therewith relative to said housing means.

No references cited.

DAVID J. WILLIAMOWSKY, *Primary Examiner.*

B. W. WYCHE, *Assistant Examiner.*